May 26, 1959 E. H. ALDRICH 2,888,144
APPARATUS FOR SEPARATING SOLIDS FROM LIQUIDS
Filed Feb. 28, 1955 3 Sheets-Sheet 1
FIG_1_
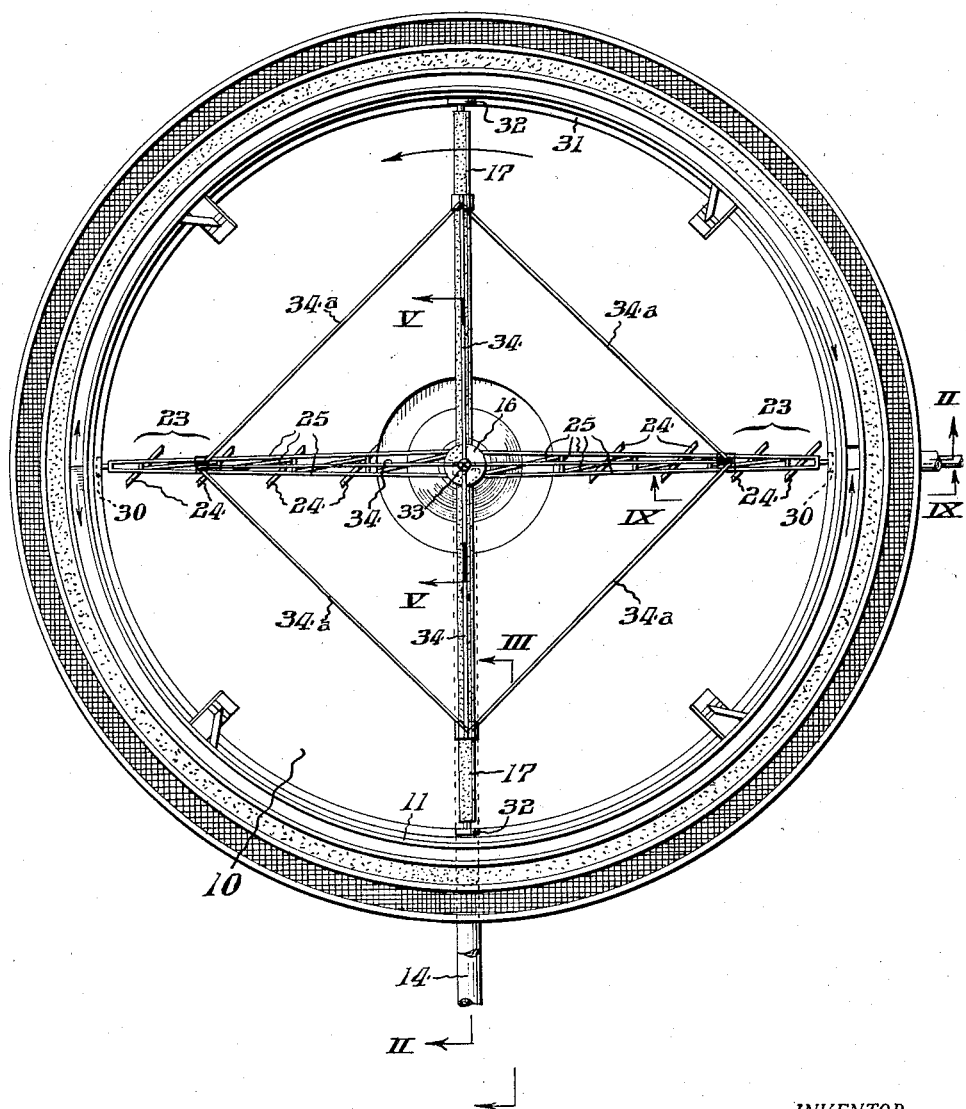
INVENTOR.
Ellwood H. Aldrich,
BY Paul & Paul
ATTORNEYS.

May 26, 1959 E. H. ALDRICH 2,888,144
APPARATUS FOR SEPARATING SOLIDS FROM LIQUIDS
Filed Feb. 28, 1955 3 Sheets-Sheet 2
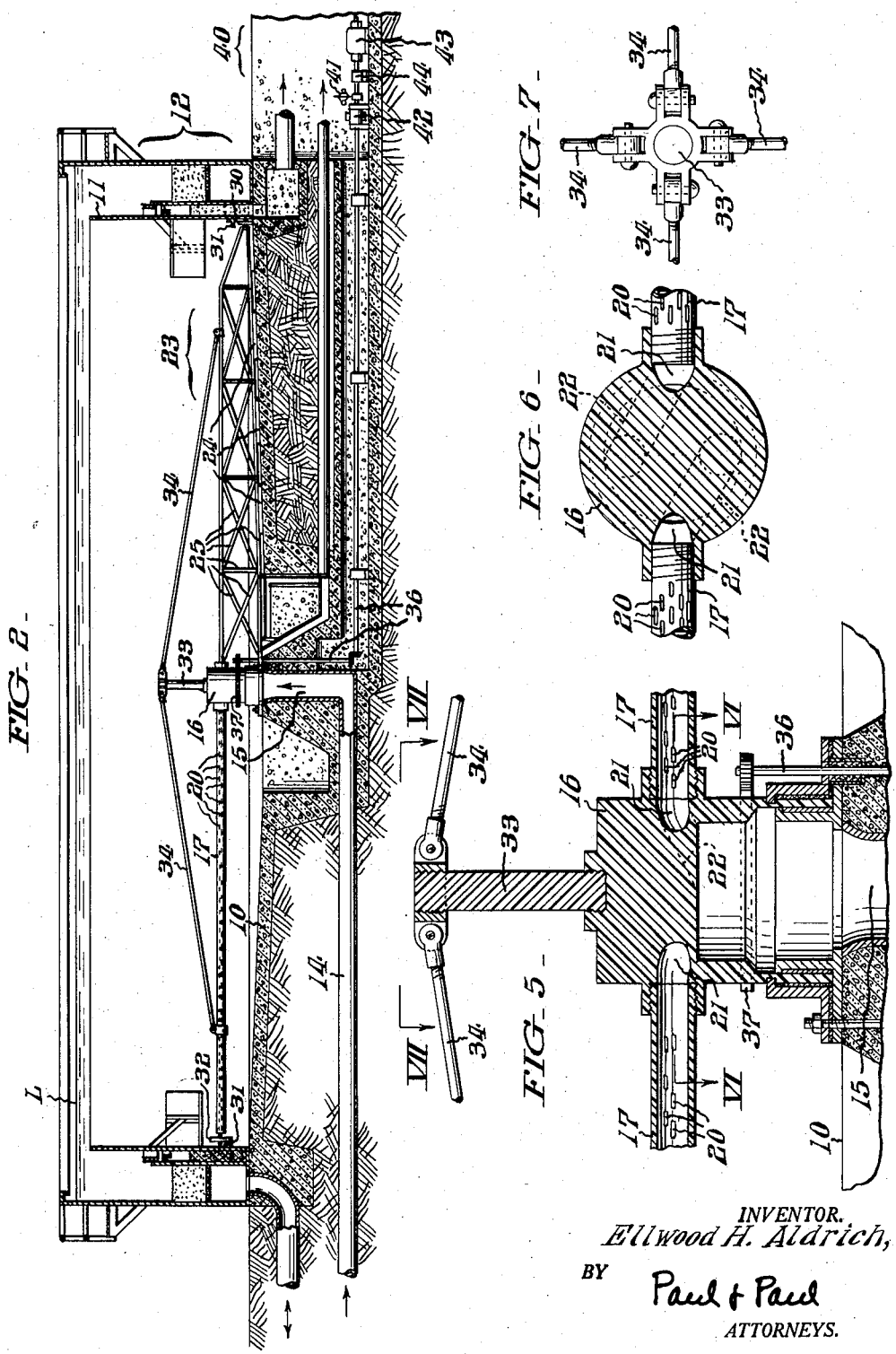
INVENTOR.
Ellwood H. Aldrich,
BY Paul & Paul
ATTORNEYS.

May 26, 1959 E. H. ALDRICH 2,888,144
APPARATUS FOR SEPARATING SOLIDS FROM LIQUIDS
Filed Feb. 28, 1955 3 Sheets-Sheet 3
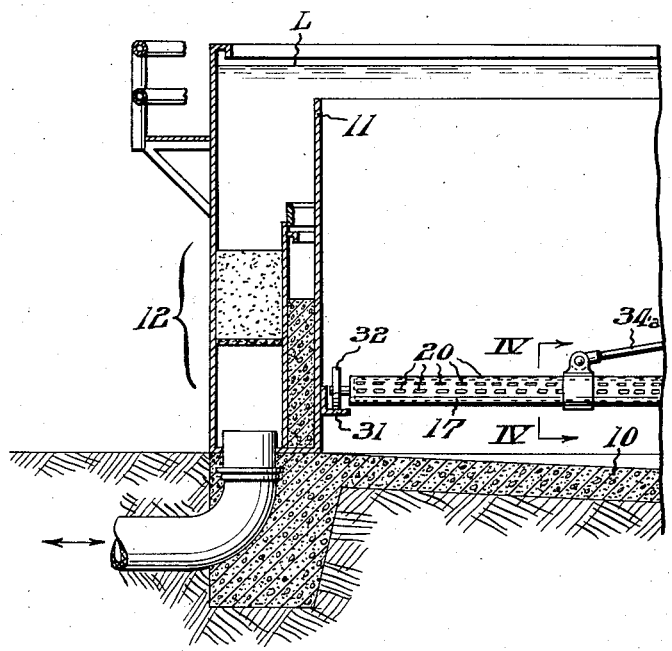
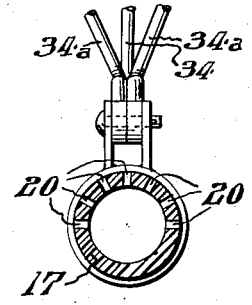
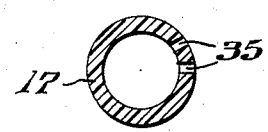
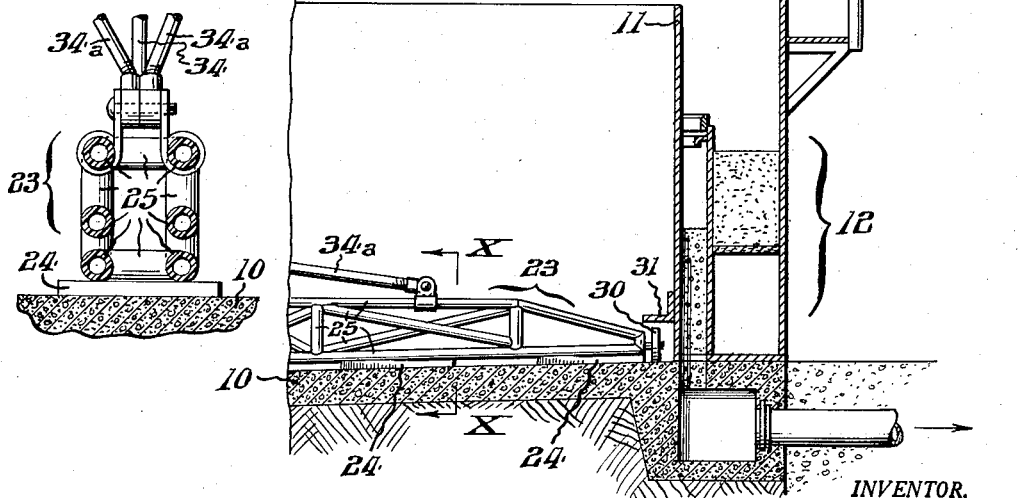
INVENTOR.
Ellwood H. Aldrich,
BY
Paul & Paul
ATTORNEYS.

United States Patent Office 2,888,144
Patented May 26, 1959

2,888,144

APPARATUS FOR SEPARATING SOLIDS FROM LIQUIDS

Ellwood H. Aldrich, Bala Cynwyd, Pa.

Application February 28, 1955, Serial No. 490,945

9 Claims. (Cl. 210—530)

This invention relates to an apparatus for settling solids from a liquid, and more particularly concerns a sedimentation apparatus for continuously treating water or any other liquid to remove settleable solids therefrom.

It is an object of this invention to provide a sedimentation or settling apparatus which can be constructed and operated at less cost than conventional apparatus. Another object is to provide an apparatus of this type which continuously treats water or any other liquid for separation of solid by settling and for removal of the settled solids, and which uses the velocity of the incoming water to assist in effecting the removal of the settled solids. Still another object of this invention is to provide a means for distributing the incoming water in the sedimentation apparatus, such means utilizing the velocity or momentum of the incoming water. Other objects and advantages of this invention, including the simplicity and economy of the same, will further appear hereinafter, and in the drawings whereof:

Fig. 1 represents a plan view of a sedimentation apparatus which embodies features of this invention;

Figs. 2 and 3 represent vertical sectional views of the same, taken as indicated by the lines and arrows II—II and III—III which appear in Fig. 1;

Fig. 4 represents a sectional view taken as indicated by the lines and arrows IV—IV which appear in Fig. 3;

Fig. 5 represents an enlarged sectional view of the central housing of the apparatus, taken as indicated by the lines and arrows V—V which appear in Fig. 1;

Figs. 6 and 7 represent sectional views taken as indicated by the lines and arrows VI—VI and VII—VII which appear in Fig. 5;

Fig. 8 represents a sectional view taken as Fig. 4, showing a modified and preferred form of distributive pipe in accordance with this invention;

Fig. 9 represents an enlarged, partial view in vertical section taken as indicated by the lines and arrows IX—IX in Fig. 1; and Fig. 10 represents a sectional view taken as indicated by the lines and arrows X—X which appear in Fig. 9.

Turning now to the drawings, the number 10 designates a floor of concrete or the like. Extending upwardly from the floor 10 is a substantially cylindrical upstanding wall 11 forming a sedimentation tank in which solids may be settled from a liquid such as water, for example. Surrounding the wall 11 is a peripheral filter 12 for the liquid product overflowing the wall 11. The construction and operation of the peripheral filter appear in detail in my co-pending application Serial No. 209,283, filed February 3, 1951, now abandoned (the disclosure of which is incorporated herein by reference), of which this application is a continuation-in-part.

Water or other liquid is introduced into the sedimentation apparatus through an inlet pipe 14 which has a vertical leg 15 at the center of the tank formed by a wall 11. Rotatably mounted above the center of the floor 10, and axially aligned with the vertical leg 15, is a head member 16 which carries a plurality of distributor arms 17. Distributor arms 17 are preferably plastic pipes (or pipes of other light weight material such as aluminum, etc.) having a plurality of perforations or holes 20 through which water or other liquid may flow. The holes 20 are preferably elongated rectangles.

Figs. 5 and 6 show that the head member 16 has a plurality of outwardly angled passages 21 having inclined walls 22 conducting the liquid from head member 16 to the distributor arms 17. In view of the angularity of the passages 21, the velocity of the liquid flowing through them tends to rotate the head member 16 about its vertical axis, in the manner of a water turbine drive.

Also extending outwardly from head member 16 are a plurality of rake supporting structures 23, each extending parallel to the plane of the surface of floor 10 and just above it. Each rake supporting structure 23 carries a plurality of angularly arranged rakes 24 which are immediately adjacent the surface of floor 10 and arranged to rake toward the center the solids which have settled from the liquid. Each rake supporting structure preferably includes a plurality of sealed, air-filled lengths of plastic or light weight pipe 25. (See particularly Figs. 9 and 10.) In view of the light weight of the plastic pipes and the buoyant effect of the air trapped in them, the entire structure including the head member 16 and the distributor arms 17 has very little underwater weight, and may even be "floating" under restraint under the surface of the liquid in the tank formed by wall 11. This arrangement is very advantageous since the liquid momentum or reactive effect in the angled passages 22 is alone sufficient to drive the raking and distributing apparatus for slow, steady rotation about the central axis of head 16.

In view of the buoyancy of the pipes 25, the ends of the rake supporting member 23 are provided with wheels 30 which travel under an angle iron 31 which is fixed to and extends around the inner surface of the tank wall 11. The angle iron 31 also serves as a supporting track for wheels 32 carried at the ends of the distributor members 17.

As shown in the drawings (particularly Figs. 1, 5 and 7) the head member 16 has a vertical brace rod 33 carrying brace means 34 which are preferably light-weight hollow rigid pipes and extend radially outwardly and downwardly for attachment to the distributing arms 17 and to the rake supporting members 23. Other brace means 34a, extending horizontally between arms, appears in Fig. 1.

Fig. 4 shows how the openings 20 may be uniformly distributed around the periphery of the distributing pipe 17, except at the under surface, which is closed to prevent turbulence at the floor level where settled solids are present. Fig. 8 shows a preferred form of the apparatus, wherein holes 35 are provided only at the trailing surface of the distributing pipe 17, the forward and bottom surfaces being closed, producing a plurality of propulsive liquid jets which assist in causing the slow, steady revolution of the rake supporting structure 23. In some cases the entire rotary effect may be produced by the jets alone, when the buoyant structure of this invention is utilized.

Means are provided for controlling the speed of rotation of the distributing and raking arms. This means includes rotatable shafts 36 which are geared to a gear 37 which is fixed to the housing member 16. Shafts 36 extend through the floor of the sedimentation apparatus to a control station 40 in which a speed governor 41 is located. The speed governor 41 is connected in a conventional manner to a brake 42 which engages the rotating shaft 36 and slows the rotation of said shaft when its speed exceeds a predetermined limit. It will be understood that governor 41 is connected by special gearing to the (slowly rotating) shaft 36 to provide sufficient speed to operate the governor.

The number 43 designates an auxiliary electric (or other) motor which is connected through a clutch 44 to the shaft 36 to drive the entire structure including the distributing arms and rake carrying arms, if desired. It will be appreciated that such drive may be caused by either the water velocity through the angled passages 21, the openings 20, or the motor 43, or any combination of them.

In view of the buoyancy of the rake carrying arms, the motor 43 may be very small in comparison to motors usually employed to drive rake carrying arms of conventional sedimentation tanks or thickeners.

While the drawings show two rake carrying arms and two distributing arms, either may be used without the other or the two may be combined in any way. For example, four or any other number of either may be employed, with the distributing arms directly above the rakes or otherwise arranged.

It will be appreciated that liquid treating or flocculating chemicals may be incorporated into the liquid feed either by introduction directly into the inlet pipe, by introduction into the tank adjacent to the level of the distributing arms, or in any other desired manner.

In operation, the impure water is fed into the pipe 14 and flows through the head 16 and through the distributor arms 17 into the tank formed by wall 11. Flocculating or other chemicals may be introduced directly into pipe 14, or may otherwise be incorporated into the water to cause flocculation of solid impurities. Under certain circumstances, flocculation may be dispensed with or, at least, sufficient settling of solids may be obtained without the addition of chemicals.

The liquid is allowed to reach a level L which is spaced above the top of the tank wall 11. Some of the heavier or faster settling solids settle in the tank formed by wall 11, while the slower settling solids drift or float over the top of the tank wall 11 for ultimate separation from the water by filtration in the filter 12. The solids which settle on the floor of tank formed by wall 11 are gradually raked into the central sludge well and are periodically or continuously removed.

When the flow of water into the tank is increased, the speed of rotation tends to increase, but this is kept below a predetermined maximum by the speed governor 41 and brake 42. The settled water is continuously filtered in the peripheral filter 12 and led through the outlet pipe provided at the bottom of the filter 12 for ultimate use.

Although specific forms of apparatus, including particular hydraulic drive means and specific distributor arms and rake supporting arms have been shown in the drawings and described herein, it will be appreciated that these may be modified in a variety of ways without departing from the scope of this invention. Similarly, equivalent elements may be substituted for others of the features shown in the drawings, parts may be reversed, and certain features of the invention may be utilized independently of the use of other features, all within the spirit and scope of the invention as defined in the appended claims.

Having thus described my invention, I claim:

1. Sedimentation apparatus for separating solids from water by settling comprising a sedimentation tank, means for feeding the water and solids into said tank, said tank having a floor for collecting the settled solids, said tank having means for withdrawing the water products, said tank also having a substantially central well extending downwardly of said floor for collection of the settled solids, means for withdrawing said solids from said well, means forming a rake support extending parallel to and just above said floor, said support carrying a plurality of rakes arranged to displace the settled solids along said floor toward and into said well, said rake support including a structural member of hollow lightweight tubing containing a substance lighter than water, which tubing is sealed to prevent mixing of said water and said lighter substance, and said tubing being submerged and buoyantly supported in said liquid, said combined tubing and substance being of such total weight and volume that they are lighter than water, and operating means for revolving said rake support in a plane substantially parallel to the plane of said floor.

2. The sedimentation apparatus defined in claim 1, wherein the operating means includes a plurality of angled walls operatively connected to the rake support and disposed in the path of movement of the incoming water.

3. The sedimentation apparatus defined in claim 1, wherein the operating means includes an arm extending outwardly from about the center of revolution of said rake support and having a plurality of openings on the trailing surface thereof, and wherein means are provided for introducing liquid into said arm for flow outwardly therein and through said openings.

4. The sedimentation apparatus defined in claim 1, wherein the operating means includes a plurality of angled walls operatively connected to the rake support and disposed in the path of movement of the incoming water and further includes an arm extending outwardly from about the center of revolution of said rake support, said arm having a plurality of openings on the trailing surface thereof, and wherein means are provided for conducting liquid from said angled walls into said arm for flow through said openings.

5. Sedimentation apparatus comprising means including a floor and a generally cylindrical wall forming a generally cylindrical container for settling solids from quiescent water, means for feeding the mixed water and solids into the container, means for withdrawing the water from the container for maintaining the water at a desired level in said container, said floor having a generally central well for collecting the solids which settle from said water, a framework of sealed, lightweight pipes located below said water level and containing a substance lighter than water, said pipes forming a rake carrying arm extending from substantially the center of said floor outwardly toward the peripheral edge thereof, said combined pipes and substance being of such total weight and volume that they are lighter than water and are buoyed up by said water, raking means carried by said arm and extending adjacent the surface of said floor, means connected to said arm for revolving said arm about said center, a wheel carried at the end of said arm, and means forming a track extending around the inner surface of the side of said container and coacting with said wheel, said track being positioned above the level of said wheel.

6. The sedimentation apparatus defined in claim 5, wherein a water distributing arm is also provided which extends outwardly from said center to substantially the peripheral edge of said container, for rotation with said rake carrying arm, and wherein a wheel is provided adjacent the end of said water distributing arm coacting with said track, said wheel of said water distributing arm being located above said track.

7. Sedimentation apparatus comprising means including a floor and a generally cylindrical wall forming a generally cylindrical container for settling solids from quiescent water, means for feeding the water into the container, means for withdrawing the water from the container for maintaining the water at a desired level in said container, said floor having a generally central well for collecting the solids which settle from said water, a framework of sealed, lightweight pipes located below said water level and containing a substance lighter than water, said pipes forming an arm extending from substantially the center of said floor outwardly toward the peripheral edge thereof, said combined pipes and substance being of such total weight and volume that they are lighter than water and are buoyed up by said water, raking means carried by said arm and extending adjacent the surface of said floor, hydraulic means connected to said arm for revolving said arm about said center, brake means operatively connected to brake the rotation of said arm in opposition to said hydraulic means, and control means operatively responsive to the speed of rotation of said arm and connected to said brake means to limit the speed of rotation of said arm.

8. Sedimentation apparatus comprising means including a floor and a generally cylindrical wall forming a generally cylindrical container for settling solids from quiescent water, means for feeding the water into the container, means for withdrawing the water from the container for maintaining the water at a desired level in said container, said floor having a generally central well for collecting the solids which settle from said water, a framework of sealed, lightweight pipes located below said water level and containing a substance lighter than water, said pipes forming an arm extending from substantially the center of said floor outwardly toward the peripheral edge thereof, said combined pipes and substance being of such total weight and volume that they are lighter than water and are buoyed up by said water, raking means carried by said arm and extending adjacent the surface of said floor, hydraulic means connected to said arm for revolving said arm about said center, brake means operatively connected to brake the rotation of said arm in opposition to said hydraulic means, controlling means for determination of the speed of rotation of said arm, and means connected from said controlling means to said brake means to limit the speed of rotation of said arm.

9. Sedimentation apparatus for separating solids from water by settling comprising a sedimentation tank, means for feeding the water and solids into said tank, said tank having a floor for collecting the settled solids, said tank having means for withdrawing the water products, said tank having means forming a rake support extending parallel to and just above said floor, said support carrying a plurality of rakes arranged to dispose the settled solids along said floor toward a common collecting point, means for withdrawing said solids from said collecting point, said rake support including a structural member of hollow lightweight tubing containing a substance lighter than water, which tubing is sealed to prevent mixing of said water and said lighter substance, said tubing being submerged and buoyantly supported in said liquid, said combined tubing and substance being of such total weight and volume that they are lighter than water, and operating means for revolving said rake support in a plane substantially parallel to plane of said floor.

References Cited in the file of this patent
UNITED STATES PATENTS

| | | |
|---|---|---|
| Re. 20,761 | Pruss | June 14, 1938 |
| 864,308 | Kelly | Aug. 27, 1907 |
| 955,843 | Bossert | Apr. 26, 1910 |
| 1,356,608 | Dorr | Oct. 26, 1920 |
| 1,882,546 | Brossman | Oct. 11, 1932 |
| 2,036,809 | Humphreys et al. | Apr. 7, 1936 |
| 2,169,442 | Wuensch | Aug. 15, 1939 |
| 2,185,785 | Dorr et al. | Jan. 2, 1940 |

FOREIGN PATENTS

| | | |
|---|---|---|
| 25,116 | Great Britain | 1906 |
| 361,680 | Great Britain | Nov. 26, 1931 |